Nov. 3, 1925.

R. B. HUNTER

CIRCUIT CONTROLLER

Filed Feb. 6, 1922

INVENTOR.
Richard B. Hunter
BY Frank H. Hubbard
ATTORNEY

Nov. 3, 1925.
R. B. HUNTER
1,560,057
CIRCUIT CONTROLLER
Filed Feb. 6, 1922
2 Sheets-Sheet 2
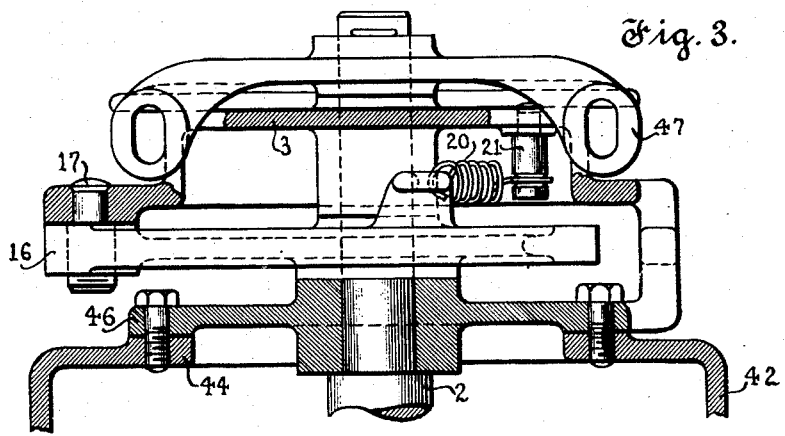
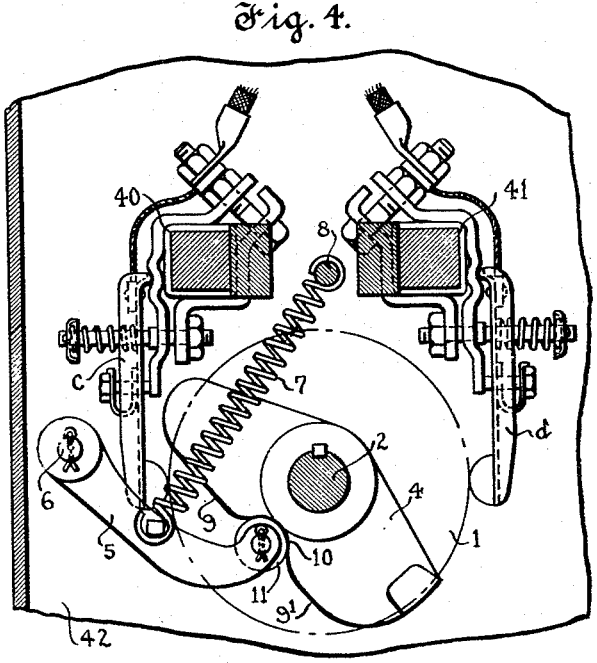
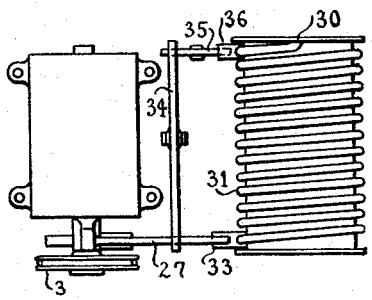
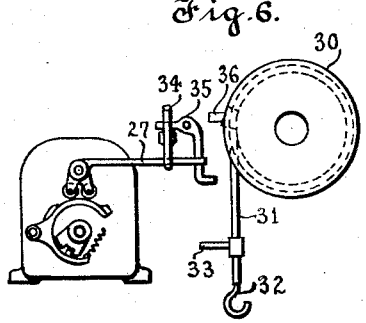
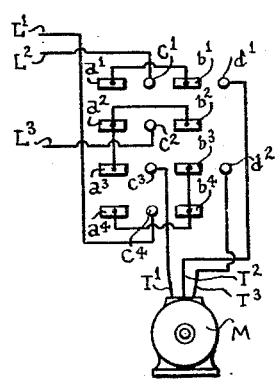
*INVENTOR.*
*Richard B. Hunter*
BY *Frank H. Hubbard*
*ATTORNEY*

Patented Nov. 3, 1925.

1,560,057

UNITED STATES PATENT OFFICE.

RICHARD B. HUNTER, OF MILWAUKEE, WISCONSIN, ASSIGNOR TO THE CUTLER-HAMMER MFG. CO., OF MILWAUKEE, WISCONSIN, A CORPORATION OF WISCONSIN.

CIRCUIT CONTROLLER.

Application filed February 6, 1922. Serial No. 534,467.

*To all whom it may concern:*

Be it known that I, RICHARD B. HUNTER, a citizen of the United States, residing at Milwaukee, in the county of Milwaukee and State of Wisconsin, have invented new and useful Improvements in Circuit Controllers, of which the following is a full, clear, concise, and exact description, reference being had to the accompanying drawing forming a part of this specification.

This invention relates to circuit controllers and while not limited thereto is particularly applicable to reversing controllers for motor driven hoists.

The present invention has among its objects to provide an improved controller adapted to limit operation of a motor driven hoist or other device to a pre-determined range and operable at will for starting, stopping and reversing of the controlled device within the range limits thereof.

A further object is to provide a controller of the aforesaid character wherein provision is made to insure against restarting of the controlled device in the same direction following attainment of its limit in that direction and prior to actual movement thereof in a reverse direction.

A still further object is to provide a simple, compact and rugged reversing controller of the character aforestated having improved operating means associated therewith adapted to limit operation of the controlled device to a pre-determined range.

Various other objects and advantages of the invention will hereinafter appear.

The accompanying drawings illustrate an embodiment of the invention particularly adapted for the control of motor driven hoists and the same will now be described, it being, however, understood that the capabilities of the invention are in nowise limited to such use and that the embodiment illustrated is susceptible of various modifications without departing from the scope of the appended claims.

In the drawings,

Fig. 3 is a detail fragmentary view of certain of the operating parts shown in Fig. 1;

Fig. 4 is a fragmentary sectional view taken through the left hand side of Fig. 2;

Figs. 5 and 6 are schematic views illustrating one form of tripping mechanism adapted for use in connection with the controller; and, Fig. 7 is a diagrammatic view illustrating a typical contact arrangement which can be employed together with the circuit connections therefor.

Figure 1:
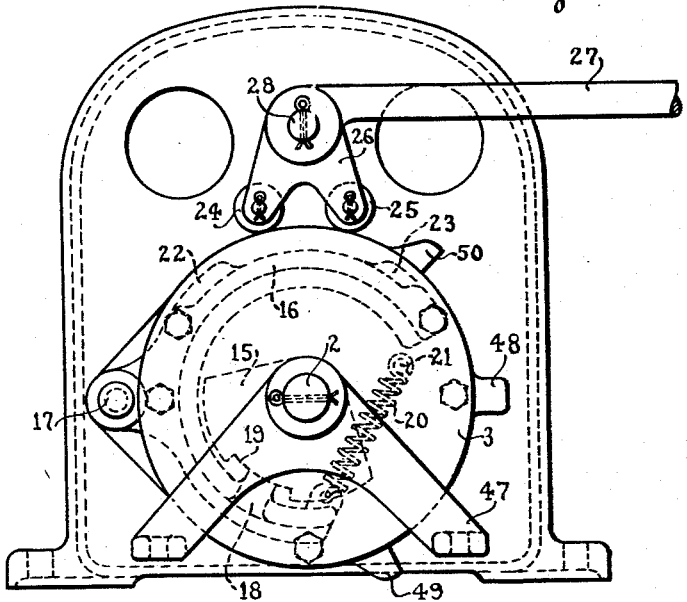
Figure 1 is a front elevational view of a controller embodying the invention.
Figure 2:
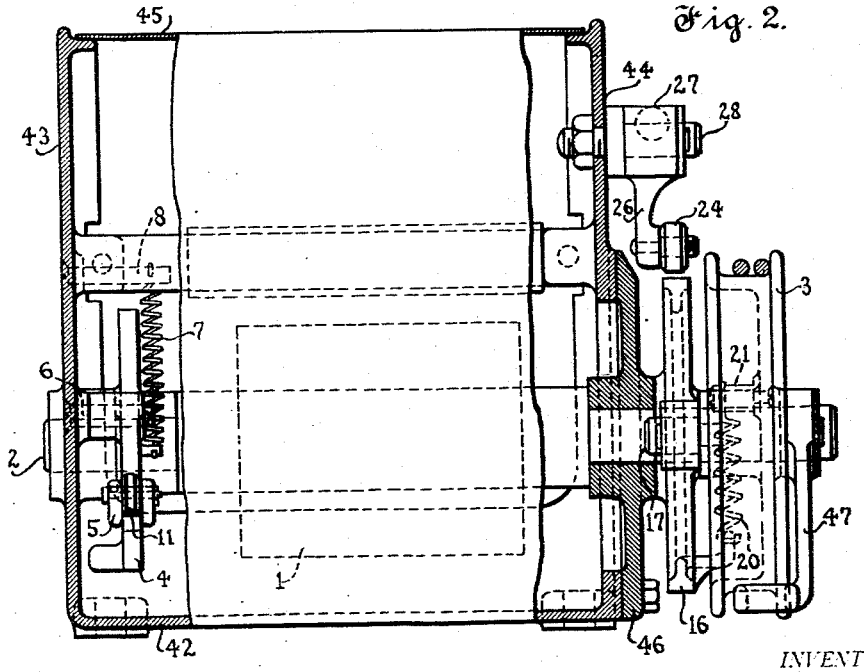
Fig. 2 is a side elevational view of the controller shown in Fig. 1, parts of the casing being broken away and shown in section.

The controller illustrated includes a contact drum 1 biased towards a given off position and adapted when moved in opposite directions from such position to co-operate with a plurality of stationary contacts for establishment of reverse power connections for the driving motor of the device to be controlled. Drum 1 is fixed to a shaft 2 having an operating rope sheave 3 rotatably mounted thereon and as hereinafter set-forth, said rope sheave is connected to said shaft through the medium of a releasable operative connection adapted to be tripped to limit operation of the controlled device to a pre-determined range.

As best shown in Fig. 4, drum 1 is biased towards off position by means including a cam member 4 fixed to shaft 2 and a co-operating lever 5 oscillatably mounted on a fixed pin 6 and biased towards said cam member by a spring 7 having one end connected to said lever and its opposite end connected to a fixed pin 8. Cam member 4 is provided with cam surfaces 9 and 9' and an intermediate notch 10 and lever 5 has its free end provided with a roller 11 for riding on said surfaces. Roller 11 rests in notch 10 in the off position of drum 1 and rides on one or the other of cam surfaces 9 and 9' when said drum is moved in either direction to bias said drum in a reverse direction.

Rope sheave 3 is rotatably mounted upon shaft 2 adjacent the right hand end thereof, and as best shown in Fig. 1 the releasable operating connection between said parts includes a sector shaped member 15 fixed to shaft 2 and a co-operating arc shaped latching member 16 carried by said sheave. Latching member 16 is arranged substantially concentric with respect to shaft 2 and is pivoted intermediate its ends upon a pin 17 fixed to a projecting lug on the left hand side of sheave 3. Latching member 16 has an inwardly projecting lug 18 adapted to co-operate with opposed shoulders formed by a recess 19 in the periphery of member 15, said recess being wider than said lug. Latching member 16 is biased to hold lug 18 in engagement with member 15 by a spring 20 connecting the lower end thereof to the pin 21 fixed to rope sheave 3. The upper surface of latching member 16 is formed to provide spaced upwardly projecting lugs 22 and 23 to be engaged respectively by spaced rollers 24 and 25, mounted upon angularly disposed depending arms 26 of a lever 27. Lever 27 is oscillatably mounted upon a fixed pin 28 and as hereinafter set forth the same is normally held in the position shown in Fig. 1 and is movable in opposite directions from such position when the controlled device moves into given limits.

The function and operation of the aforedescribed mechanism will now be more fully set forth. Assuming that member 27 is in its intermediate position it is apparent that latching member 16 through engagement with the shoulders formed by recess 19 in latch plate 15, is adapted upon movement of operating member 3 in opposite directions to move drum controller 1 into either of its operative positions. Tripping member 27 as hereinafter set forth is operatively connected to the controlled device whereby the same moves upwardly when said device moves into a given limit and downwardly when said device moves in an opposite direction to a given limit. Assuming that clockwise rotation of drum 1 establishes power connections for effecting operation of the device in the former direction and counterclockwise rotation thereof establishes power connections for reverse operation of the device, it is apparent that rollers 24 and 25 will function through engagement with projections 22 and 23 respectively to insure tripping of the latch for return of drum 1 to off position when the controlled device moves into either of its limits. Further it is apparent that following tripping of latch member 16 by roller 24 such roller will remain in the path of projection 22 to prevent return of drum 1 in a clockwise direction but permitting its movement in a counter-clockwise direction while upon tripping of said latch by roller 25, said roller will co-operate with projection 23 to prevent return of the drum in a counter-clockwise direction while permitting its movement in a clockwise direction.

The aforedescribed controller can be used to control various types of devices and in Figs. 5 and 6 the same is shown in connection with a winding drum 30 having a hoisting cable 31 wound thereon. Cable 31 has one end fixed to the drum in the usual manner and the opposite end is provided with the usual hoisting hook 32. Tripping lever 27 of the controller is movable upwardly from its intermediate position by a projection 33 secured to cable 31 when hook 32 is raised to its upper limit. Tripping lever 27 is movable downwardly from its intermediate position through the medium of levers 34 and 35 and a projection 36 secured to cable 31. Lever 34 is arranged above tripping lever 27 and is pivoted intermediate its ends while lever 35 is pivoted intermediate its ends and has one end arranged below lever 34 and its opposite end located in the path of projection 36. Projection 36 is arranged to engage lever 35 when the hoisting hook reaches its lowering limit and upon engagement thereof with said lever the latter is rotated in a clockwise direction and acts through the lever 34 to move tripping lever 27 downwardly from its intermediate position.

Referring now to Fig. 7 the same illustrates diagrammatically a circuit arrangement whereby the controller is adapted to establish reverse power connections for a three phase motor M. Drum 1 is provided with two sets of aligned contacts one set including contacts $a'$ to $a^4$ inclusive and the other including contacts $b'$ to $b^4$ inclusive. Said contacts co-operate with four aligned stationary contacts $c'$ to $c^4$ inclusive and two aligned stationary contacts $d'$ and $d^2$. Contacts $c$ and $d$ are arranged on opposite sides of drum 1 and as shown in Fig. 4 the same are of a well known type and are mounted upon insulated supporting members 40 and 41 respectively. Contact $a'$ is electrically connected to contacts $b'$, contacts $a^2$ and $a^3$ are electrically connected to contact $b^2$ and contact $a^4$ is electrically connected to contacts $b^3$ and $b^4$. Lines $L'$ $L^2$ and $L^3$ are respectively connected to contacts $c^4$, $c'$ and $c^2$ while the terminals $T^1$, $T^2$ and $T^3$ of motor M are respectively connected to contacts $c^3$, $d'$ and $d^2$. Thus it is apparent that upon movement of drum 1 towards the left the same serves to connect lines $L'$, $L^2$ and $L^3$ to terminals $T^1$, $T^2$ and $T^3$ respectively, while reverse movement of said drum reverses the aforesaid connections, line $L'$ being then connected to terminal $T^3$ and line $L^3$ being connected to terminal $T^1$. It is apparent that the aforedescribed contact arrangement can be employed for the control of other types of A. C. motors and that the contact arrangement can also be modified for the control of D. C. motors.

While the controller above described may be mounted in any preferred manner, the same is shown as provided with an enclosing casing 42 provided with end walls 43 and 44 having a sheet metal cover 45 therebetween. Shaft 2 has its left end journaled in a bearing in wall 43 while the right hand end of said shaft is journaled in a bearing provided in a member 46 fixed to end wall 44. The contact supporting members 40 and 41 are fixed at opposite ends to inwardly projecting lugs on end walls 43 and 44 while pin 8 is fixed to end wall 43 and pin 28 to front wall 44. In the embodiment shown rope sheave 3 has associated therewith a rope guide 47 which is mounted on shaft 2 and is provided with angularly disposed arms having apertured lugs at their lower ends for receiving the operating rope. To prevent overthrow of drum 1 beyond its operative positions, front wall 44 of the casing is provided with a projecting lug 48 to be engaged by spaced lugs 49 and 50 on sheave 3.

What I claim as new and desire to secure by Letters Patent is:

1. In a motor controller, the combination with a control element movable in opposite directions from an intermediate position to establish reverse power connections for the motor, an operating member for said element movable with respect thereto, a releasable connection between said member and said element including co-operating latching parts, one fixed to said element and the other movable with said operating member and a tripping member normally in an intermediate position and movable in opposite directions from such position to trip said second mentioned latching part.

2. In a controller for electric motors, the combination with relatively stationary contacts, of a co-operating element movable in opposite directions from an intermediate position for starting the controlled motor in opposite directions selectively, and actuating means for said element including an operating part movable with respect to said element and a latching member associated with said part and controllable to limit temporarily the actuating power of said part to unidirectional actuation of said elements.

3. In a controller for a motor driven device, the combination with relatively stationary contacts, of a co-operating contacting element movable in opposite directions from an intermediate off position for starting the controlled device in opposite directions selectively, an operating member movable with respect to said contacting element and an operative connection between said member and said element including a latching member normally adapted to provide for movement of said element in either direction and controllable to render said operating part temporarily ineffective for actuating said contacting element in one direction while providing for movement of said element in another direction by said member.

4. In a controller for a motor driven device, the combination with a control element biased to an intermediate position and movable in opposite directions from such position to establish reverse power connections for the device selectively, an operating member for said element movable with respect thereto, a latch pivotally secured to said operating member and normally adapted to move said contact element in opposite directions from its intermediate position and a tripping member for said latch movable in either direction from a given position to limit the actuating power of said operating member to unidirectional actuation of said element.

5. In a controller for a motor driven device, the combination with a movable control element biased to an intermediate off position and movable in opposite directions from such position to establish reverse power connections for the device selectively, an operating member for said element movable with respect thereto, a releasable connection between said member and said element including a latching member pivoted to said operating member and releasable upon movement of said element into either of its operative positions to permit return of the latter to off position and means for releasing said latch in either of its operative positions and adapted to render the same temporarily ineffective for movement of said element to its last operative position but effective for movement of said element to its other operative position.

6. In a controller for a motor driven device, the combination with a control element biased towards an intermediate off position and movable in opposite directions from such position to establish reverse power connections for the device selectively, an operating member for said element movable with respect thereto, a releasable connection between said member and said element including a latch pivoted to said member and normally adapted to move said element in opposite directions selectively and a tripping member normally in an intermediate position and adapted upon movement in opposite directions from such position to trip said latch, said member being adapted when moved in either direction out of said intermediate position to limit the actuating power of said operating member to unidirectional actuation of said element.

7. In a controller for a motor driven device, the combination with a control element biased towards an intermediate off position and movable in opposite directions from such position to establish reverse power connections for the driven device selectively, of an operating member for said control element movable with respect thereto, a latch associated with said member and normally adapted to move said element in opposite directions and a tripping member for said latch, said latch having a plurality of parts to be selectively engaged by said tripping member upon movement thereof in opposite directions from an intermediate position, said parts being adapted upon movement of said tripping member out of its intermediate position to render said latch inoperative to actuate said element in one direction.

8. In a controller for a motor driven device, in combination, a control element biased towards an intermediate off position and movable in opposite directions from such position to establish reverse power connections for the driven device selectively, of an operating member for said control element movable with respect thereto, a latch associated with said member and normally adapted to actuate said element in opposite directions and a tripping member for said latch movable in opposite directions from an intermediate position, said latch being provided with parts to be engaged selectively by said tripping member upon movement thereof in opposite directions from an intermediate position, one of said parts being engageable by said tripping member upon positioning of said element in one of its operative positions, and the other being engageable by said tripping member upon positioning of said element in the other of said operative positions.

9. In a controller for a motor driven device, the combination with a control element biased to an intermediate off position and movable in opposite directions from such position to establish reverse power connections for the driven device selectively, of an operating part for said element movable with respect thereto, a latch pivotally secured to said operating part and normally adapted to actuate said element in either direction, and a tripping member for said latch movable in opposite directions from an intermediate position, said latch having a plurality of parts to be selectively engaged by said tripping member upon movement of the latter in opposite directions from its intermediate position, one of said parts being engageable by said tripping member when said element is in one of its operative positions and the other being engageable by said tripping member when said element is in the other of its operative positions.

10. The combination with a motor driven hoist, of a control element biased to neutral position and movable in opposite directions to establish reverse power connections for said hoist, means for establishing said reverse power connections comprising an operating member and a latch pivoted thereto for connecting the same with said control element to move the latter from said biased position, and cooperating means adapted upon a given movement of said hoist in either direction to release said latch and permit said control element to return to neutral position, said last mentioned means being also adapted to temporarily provide for movement of said control element in one direction only from said neutral position.

11. The combination with a motor driven hoist, of a control element biased to neutral position and movable in opposite directions to establish reverse power connections for said hoist, operating means for said control element comprising a movable member and a latch for connecting the same with said control element to move the latter from said biased position, and cooperating means adapted upon a given movement of said hoist in either direction to release said latch and permit said control element to return to neutral position, said last mentioned means providing against further movement of said hoist in the same direction.

In witness whereof, I have hereunto subscribed my name.

RICHARD B. HUNTER.